(12) United States Patent
Cannon

(10) Patent No.: US 7,717,243 B2
(45) Date of Patent: May 18, 2010

(54) TORQUE CONVERTER WITH FLUID AND VISCOUS COUPLINGS

(76) Inventor: Clint D. Cannon, 5293 Ward Rd., Arvada, CO (US) 80003

( * ) Notice: Subject to any disclaimer, the term of this patent is extended or adjusted under 35 U.S.C. 154(b) by 617 days.

(21) Appl. No.: 11/590,512

(22) Filed: Oct. 31, 2006

(65) Prior Publication Data

US 2008/0099291 A1  May 1, 2008

(51) Int. Cl.
*F16D 33/00* (2006.01)
(52) U.S. Cl. .................. 192/3.28; 192/3.26; 192/3.31
(58) Field of Classification Search ....... 192/3.25–3.29, 192/3.31
See application file for complete search history.

(56) References Cited

U.S. PATENT DOCUMENTS

| | | | | |
|---|---|---|---|---|
| 2,707,408 A | * | 5/1955 | Ahlen | .......................... 477/57 |
| 4,177,885 A | | 12/1979 | Ross | |
| 4,496,034 A | * | 1/1985 | Bopp | ......................... 192/3.28 |
| 4,706,790 A | * | 11/1987 | Lockhart et al. | .............. 192/3.3 |
| 5,125,486 A | * | 6/1992 | Murata | ....................... 192/3.26 |
| 5,172,796 A | * | 12/1992 | Campbell et al. | .......... 192/3.29 |
| 5,211,270 A | | 5/1993 | Tamura et al. | |
| 5,337,867 A | | 8/1994 | Kirkwood | |
| 5,361,880 A | * | 11/1994 | Bojas | ........................ 192/3.25 |
| 5,441,135 A | | 8/1995 | Womer et al. | |
| 5,799,763 A | | 9/1998 | Dehrmann | |
| 5,918,713 A | | 7/1999 | Shimizu et al. | |
| 6,334,816 B1 | * | 1/2002 | Wack et al. | .............. 464/68.92 |
| 6,615,962 B2 | | 9/2003 | Back et al. | |
| 6,702,079 B2 | | 3/2004 | Bauer et al. | |
| 6,705,434 B1 | | 3/2004 | Bunker | |
| 6,712,186 B1 | | 3/2004 | Arhab | |

* cited by examiner

*Primary Examiner*—Ha D. Ho
(74) *Attorney, Agent, or Firm*—Holland & Hart, LLP

(57) ABSTRACT

In one embodiment, a torque converter is provided with a fluid coupling and a viscous coupling. The viscous coupling includes a plurality of closely-spaced surfaces, wherein facing ones of the closely-spaced surfaces are alternately splined to rotate with driving or driven elements of the torque converter, and wherein the closely-spaced surfaces have an average spacing that causes ones of the surfaces rotating with the driving elements to exert a viscous pull on ones of the surfaces rotating with the driven elements when the torque converter is filled with a viscous fluid. A fluid receiving portion of the torque converter receives a viscous fluid into the torque converter, and a fluid return portion expels the viscous fluid from the torque converter. The fluid receiving and fluid return portions are positioned to define a fluid pumping path through the torque converter, wherein the fluid pumping path traverses paths between the closely-spaced surfaces of the viscous coupling, and wherein the fluid pumping path increases a shear force of the viscous fluid as the viscous fluid is pumped between the closely-spaced surfaces of the viscous coupling.

23 Claims, 11 Drawing Sheets

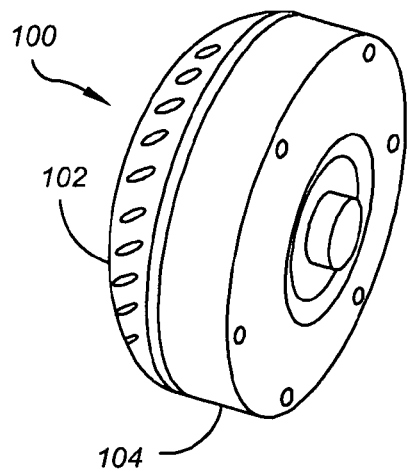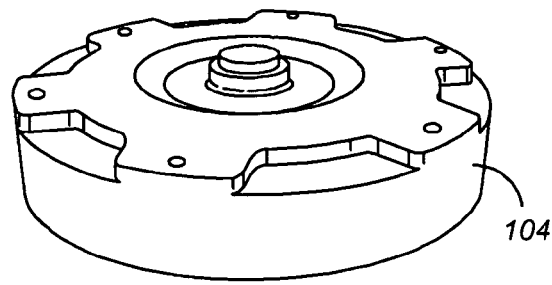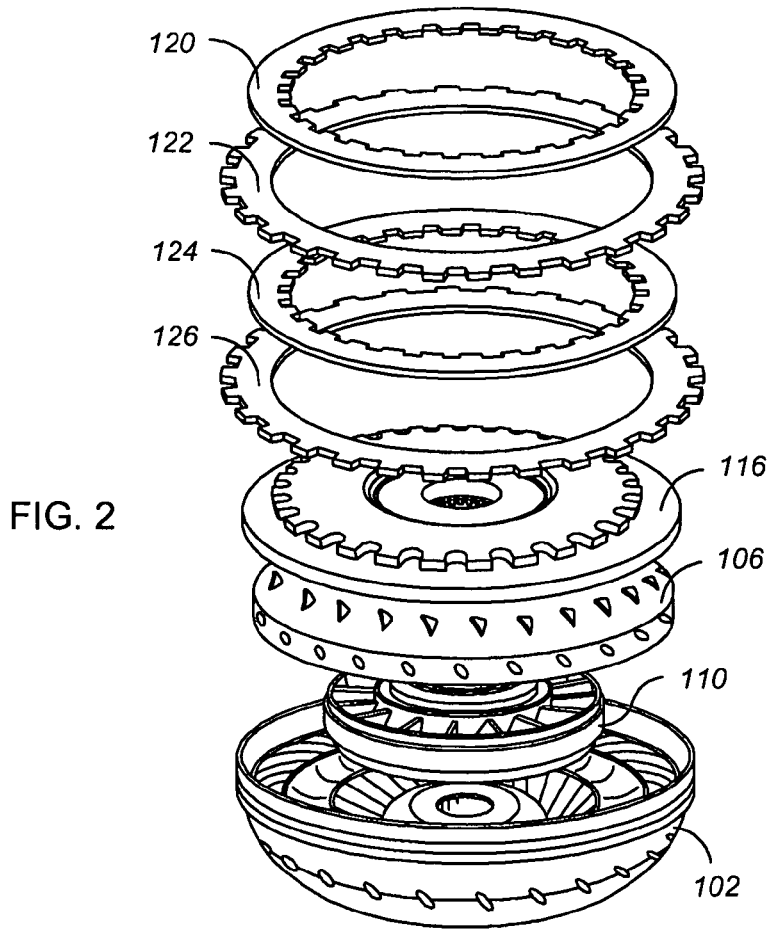
FIG. 1
FIG. 2

TORQUE CONVERTER WITH FLUID AND VISCOUS COUPLINGS

BACKGROUND

A vehicle with an automatic transmission requires a torque converter to vary the transfer of torque between the vehicle's engine and transmission. Without a torque converter, a vehicle with an automatic transmission would be unable to keep its engine running while stopped, and would lurch forward (i.e., at the engine's speed) when put into gear.

At idle and low vehicle speeds, components of a torque converter rotate at different speeds (i.e., some components are fixed to the engine and rotate at engine speed, and other components are fixed to the transmission and rotate at less than engine speed or not at all). As a torque converter transfers more and more torque between a vehicle's engine and transmission, a point is reached where all components of a torque converter rotate at or about the same speed. When this point is reached, it is typically desirable to "lock" the components of the torque converter to one another. When in "lockup", a torque converter transfers 100% of an engine's torque to a vehicle's transmission, despite small (and sometimes moderate) changes in an engine's speed.

Prior to entering "lockup", a torque converter not only fails to transfer 100% of an engine's torque to a vehicle's transmission, but the slip between the driving and driven components of the torque converter results in lost energy, which is lost in the form of excess heat. If a torque converters components are repeatedly subjected to this excess heat, the components of the torque converter can age or fail prematurely.

BRIEF DESCRIPTION OF THE DRAWINGS

Illustrative embodiments of the invention are illustrated in the drawings, in which:

FIG. 1 is a perspective view of an exemplary torque converter;

FIG. 2 illustrates a first exploded view of the FIG. 1 torque converter;

DETAILED DESCRIPTION

Figure 3:
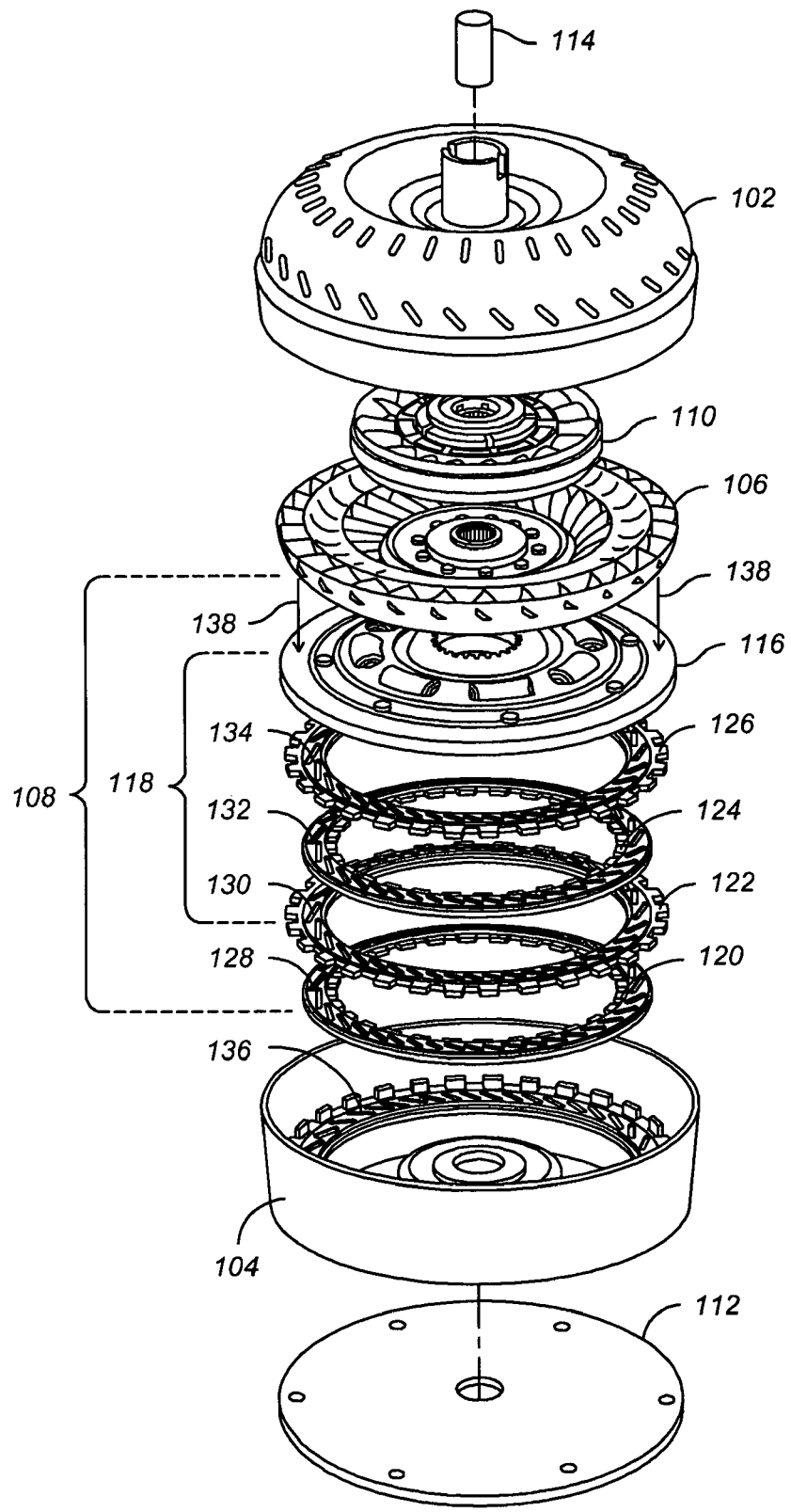
FIG. 3 illustrates a second exploded view of the FIG. 1 torque converter.

An exemplary torque converter 100 is illustrated in FIGS. 1-3. In general, the torque converter 100 comprises a fluid coupling 140 and a viscous coupling 142. The fluid coupling 140 includes 1) a fluid-directing means, such as an impeller 102, 2) a fluid-receiving means, such as a turbine 106, and 3) an optional, but preferable, fluid re-directing means, such as a stator 110. The impeller 102 is fixed to an enclosure means, such as a cover 104. The impeller 102 and cover 104 may be fixed to one another in a number of ways, including, by press fitting or welding. Once fitted to one another, the impeller 102 and cover 104 define a cavity in which the turbine 106 and stator 110 are positioned.

The impeller 102, turbine 106 and stator 110 are all configured for rotation about a common axis, with a fluid-receiving surface of the turbine 106 facing a fluid-directing surface of the impeller 102, and with the stator 110 being positioned between the fluid-directing and fluid-receiving surfaces. The impeller 102 and turbine 106 are configured to rotate about the common axis independently from each other, and the stator 110 is configured to rotate about the common axis in a mostly independent manner (as will be discussed in greater detail later in this description).

In use, the torque converters impeller 102 or cover 104 may be coupled to a drive member, such as an engine crankshaft or flywheel. Similarly, an output shaft to which the torque converter's turbine 106 is attached may be coupled to a driven member, such as the input shaft of an automatic transmission.

By way of example, FIG. 3 shows that a drive member 112 may be attached to the cover 104, and a driven member 114 may be attached to the turbine 106 (by means of an axial hole provided in the impeller 102). Alternately, the drive member 112 could be attached to the impeller 102, and the driven member 114 could be attached to the turbine 106 via a hole in the cover 104.

When filled with a viscous fluid (e.g., automatic transmission fluid (ATF)), and upon start of a vehicle's engine, the torque converter 100 operates as follows. First, the drive member 112 begins to turn at engine speed. Consequently, the impeller 102 and cover 104 turn at engine speed. The rotation of the impeller 102 about the common axis causes the fluid-directing surface of the impeller 102 to direct (or pump) fluid toward the fluid-receiving surface of the turbine 106. As shown, both the fluid-directing and fluid-receiving surfaces may comprise a plurality of fins (or vanes) that either push fluid (in the case of the impeller 102) or are pushed by fluid (in the case of the turbine 106).

As the impeller 102 pumps fluid toward the turbine 106, an engine's power is transferred from the impeller 102 to the turbine 106 via the fluid, and the turbine 106 transfers power to a vehicle's transmission via the transmission's input shaft 114. In this manner, a fluid coupling 140 is formed between the impeller 102 and the turbine 106, and a vehicle begins to move. But for the stator 110, however, the vehicle would begin to move at a relatively slow rate.

When a driver accelerates from a stop, or accelerates at low vehicle speeds, the rotational speed of the impeller 102 is greater than the rotational speed of the turbine 106. During these low vehicle speeds, the stator 110 redirects fluid as it returns from the turbine 106 so that the direction of the fluid is changed back to that of the impeller 102. The stator 110 is mounted on a one-way clutch that allows it to rotate with the direction of the engine, but not against engine rotation. The one-way clutch locks the stator 110 when the impeller 102 is turning faster than the turbine 106, and the stator 110 redirects fluid flow over the stator vanes in an outward radial direction to increase the amount of engine torque transferred between the impeller 102 and the turbine 106 (i.e., the stator 110 serves as a torque transfer multiplier). The amount of torque multiplication provided by the stator 110 is controlled by the shape of the stator's vanes.

When the speed of a torque converter's turbine 106 is equal to (or approximately equal to) the speed of the torque converter's impeller 102, the stator 110 freewheels on its shaft so that fluid flow from the turbine 106 to the impeller 102 is restricted as little as possible, thereby improving torque converter efficiency.

When the speed of a torque converter's turbine 106 is equal to (or approximately equal to) the speed of the torque converter's impeller 102, the torque converter 100 transfers a vehicle's maximum engine torque to the vehicle's transmission (and with a well designed transmission, to the vehicle's wheels). When this occurs, it is typically desirable to hold this state absent a driver's conscious decision to significantly decelerate his or her vehicle. In other words, it is typically desirable to hold a maximum torque transfer state through small (and possibly even moderate) changes in a vehicle's engine speed. However, given the difficultly in maintaining a torque converter's fluid coupling 140 in a constant state, something more is typically required to "lock" the rotational speeds of the torque converter's impeller 102 and turbine 106. This something more is sometimes provided by a lockup clutch 108.

The lockup clutch 108 of the torque converter 100 shown in FIGS. 1-3 includes a piston 116 and a clutch-pack 118. The piston 116 is located between the turbine 106 and the cover 104 and is splined to (and rotates with) the turbine 106. The clutch-pack 108 includes a set of rings 118, and in one embodiment includes a set of four rings 120, 122, 124, 126. The first and third of the rings 120, 124 are splined to (and rotate with) the piston 116. The second and fourth of the rings 122, 126 are respectively positioned 1) between the first and third rings 120, 124, and 2) between the third ring 124 and the piston 116. The second and fourth rings 122, 126 are both splined to (and rotate with) the impeller 102 and cover 104.

Preferably, each of the rings 120, 122, 124, 126 is provided with one or more linings 128, 130, 132, 134 to control their coefficient of friction and wear. By way of example, FIG. 3 shows each of the rings 120, 122, 124, 126 with a lining 128, 130, 132, 134 on a side thereof facing the piston. A lining 136 is also placed on the inside of the cover 104. The piston 116 and unlined sides of the rings 120, 122, 124, 126 comprise clutch surfaces for the linings 128, 130, 132, 134, 136 to bear against when the piston 116, rings 120, 122, 124, 126 and cover 104 frictionally engage one another. In this manner, five frictional couplings are created: one between each pair of adjacent rings, one between the first ring 120 and the cover 104, and one between the fourth ring 126 and the piston 116.

Note that depending on the composition and texture of the various clutch surfaces, the linings 128, 130, 132, 134, 136 might not be needed. Furthermore, more or fewer linings could be distributed in various ways among the rings 120, 122, 124, 126.

Figure 4:
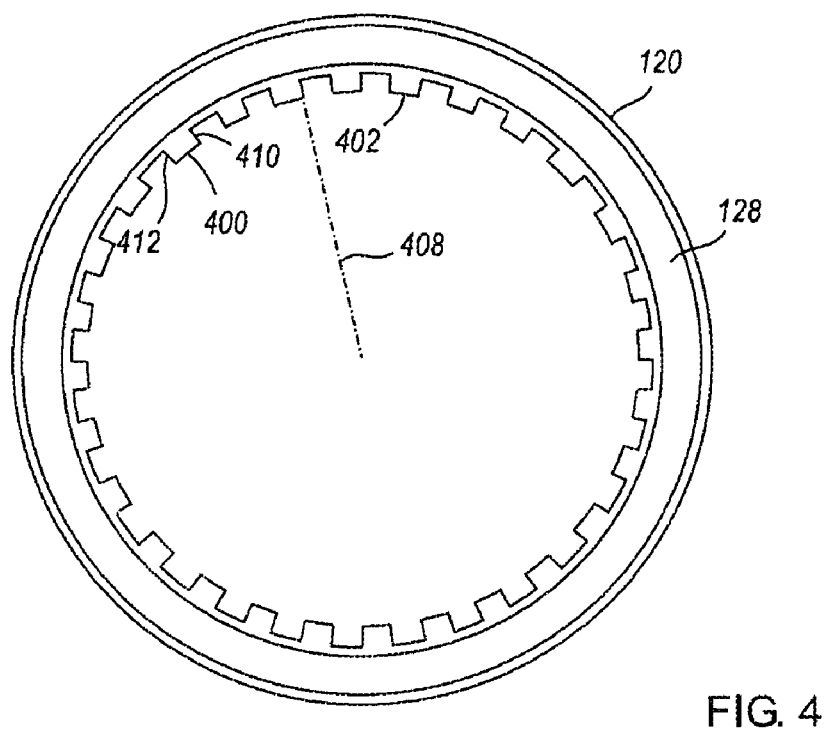
FIG. 4 illustrates a first lockup clutch ring of the FIG. 1 torque converter.
Figure 5:
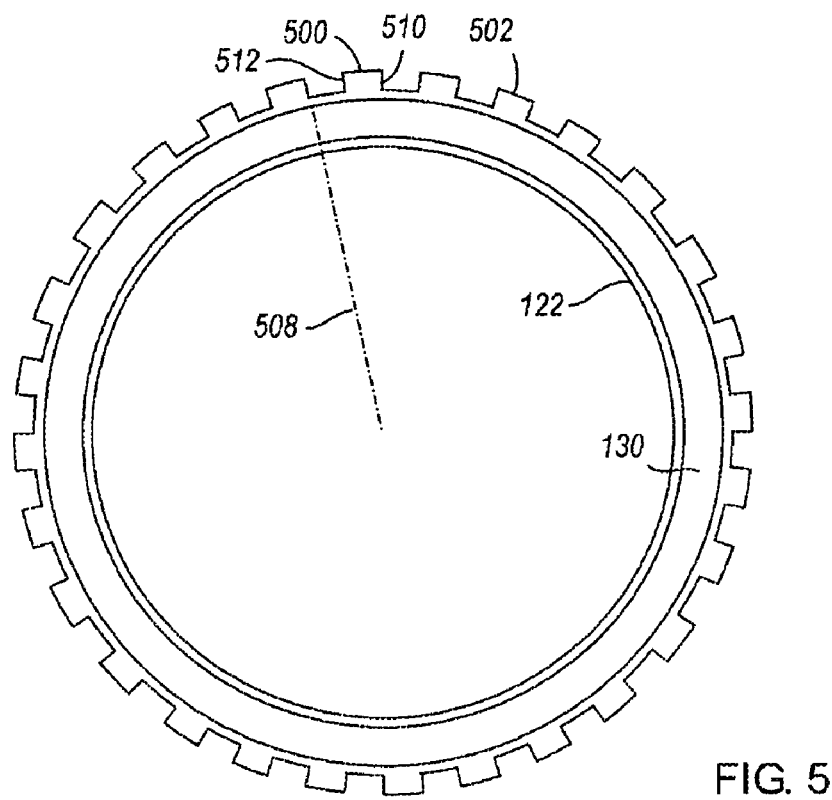
FIG. 5 illustrates a second lockup clutch ring of the FIG. 1 torque converter.
Figure 6:
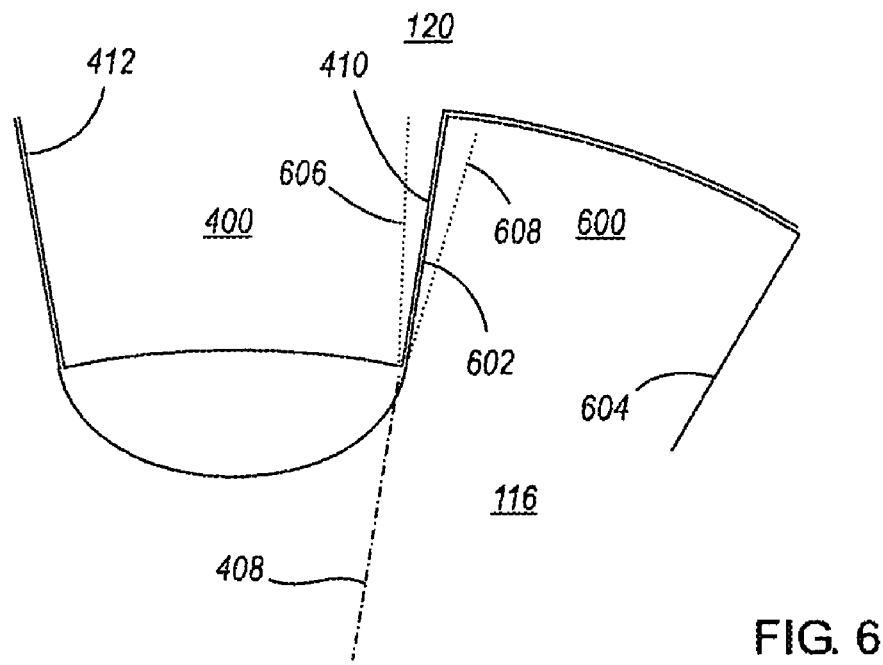
FIGS. 6 & 7 illustrate the tab and lug design of the FIG. 1 torque converter.

By way of example, each of the first and third rings 120, 124 of the clutch-pack 108 may comprise a plurality of inwardly facing tabs (e.g., tabs 400 and 402 in FIG. 4) that are splined to lugs on the piston (see, e.g., tab 400 and lug 600 in FIG. 6). Similarly, each of the second and fourth rings 122, 126 may comprise a plurality of outwardly facing tabs (e.g., tabs 500 and 502 in FIG. 5) that are splined to lugs on the cover 104 (see, e.g., tab 500 and lug 700 in FIG. 7).

As the impeller 102 directs fluid toward the turbine 106, the turbine 106 moves toward the cover 104, and a fluid pressure between the turbine 106 and the piston 116 gradually increases. As the pressure against the piston 116 increases (in the direction of arrow 138), the piston 116, rings 120, 122, 124, 126 and cover 104 are compressed toward one another; and, above a torque converter lockup pressure, the piston 116, rings 120, 122, 124, 126 and cover 104 frictionally engage one another and "lock". To ensure that the lockup pressure is achieved and maintained, a vehicle's transmission control system will typically reverse the flow of fluid through the torque converter 100 upon reaching a particular condition (such as a particular engine RPM), thereby causing the pressure of the viscous fluid within the torque converter 100 to increase to and maintain the lockup pressure.

Prior to lockup, fluid flows between the mating surfaces of the cover 104, rings 120, 122, 124, 126 and piston 116 so as to lubricate them as they are compressed together. However, much of the fluid that is trapped between the piston 116 and the cover 104 as the torque converter 100 enters lockup escapes through the transmission input shaft 114 about which the torque converter 100 is fitted.

When the torque converter 100 is not in lockup (typically during engine start, during vehicle acceleration from a stop, and during vehicle acceleration at low speeds), the rings 120, 122, 124, 126 of the clutch-pack 108 are subjected to extreme torsional forces. Not only are the rings subjected to broad changes in torsional forces (e.g., as the rotational speed of an engine's crankshaft varies during vehicle acceleration and deceleration), but the rings 120, 122, 124, 126 are also subjected to rapid changes in torsional forces as brief pauses between firings of an engine's cylinders (and even vehicle vibrations) are imparted to the rings. These torsionals often lead to 1) premature wear and peaning of the tabs 400, 402, 500, 502 and lugs 600, 700 shown in FIGS. 4-7, and eventually, to 2) premature failure of a vehicle's torque converter 100. Transmission failure is also possible (i.e., due to the sharing of fluid impregnated with metal filings between the torque converter 100 and transmission).

Figure 7:
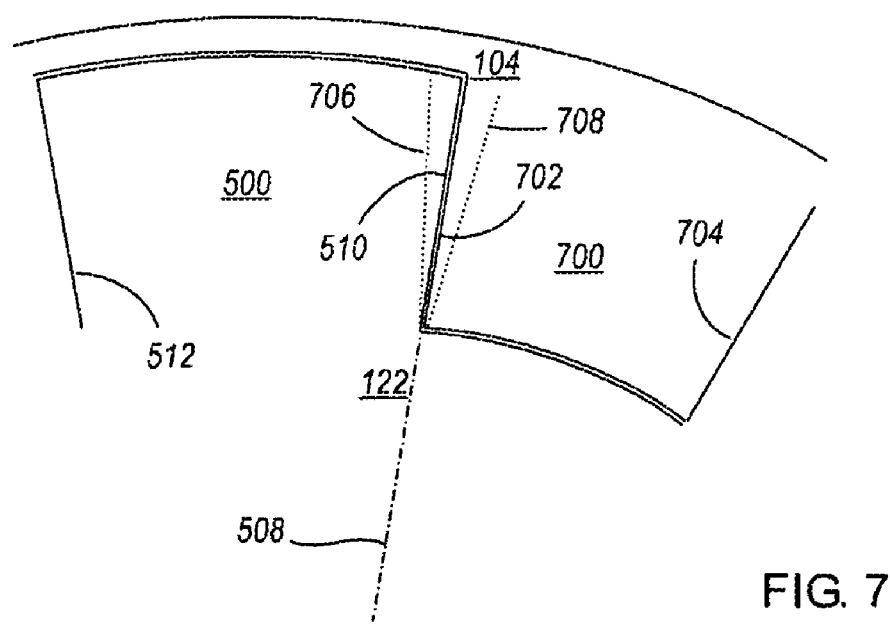
Figure 8:
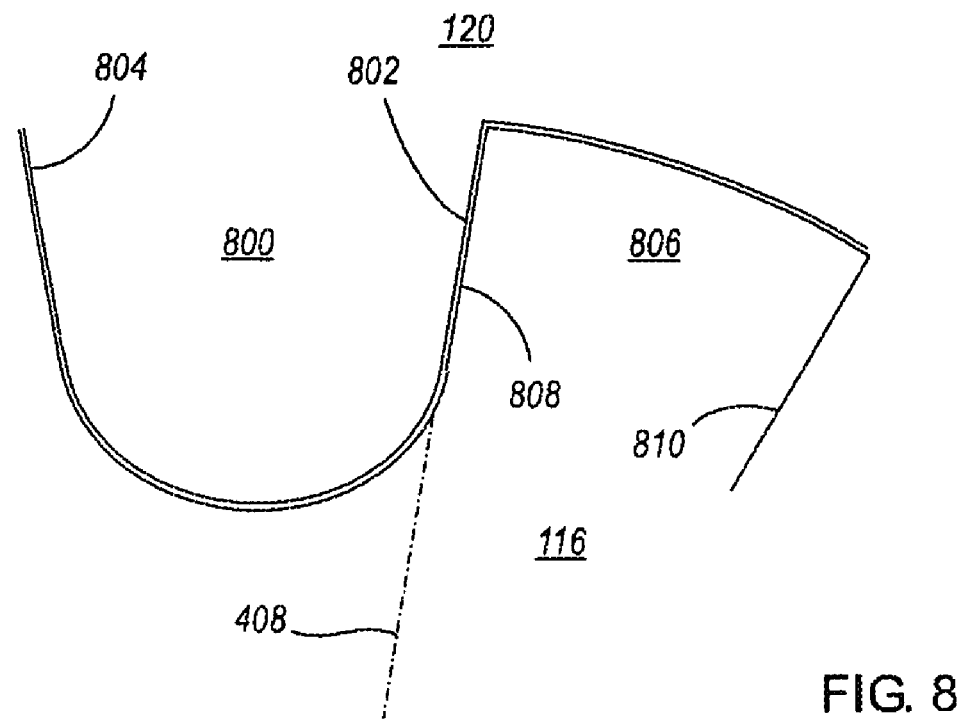
FIGS. 8 & 9 illustrate a first alternative to the tab and lug design illustrated in FIGS. 6 & 7.
Figure 9:
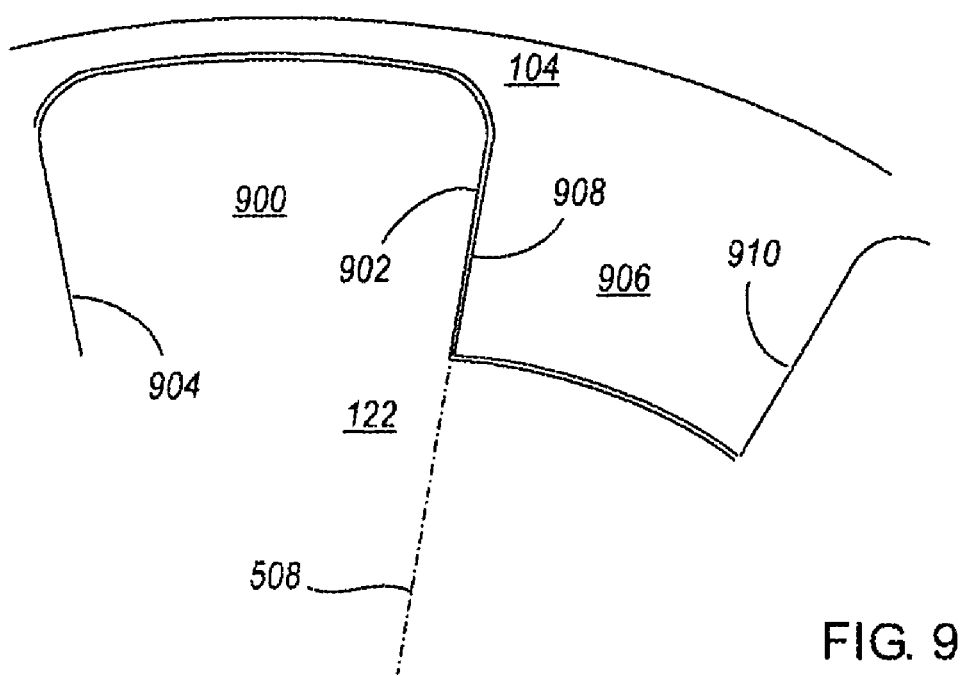

To lessen the wear and peaning of tabs 400, 402, 500, 502 and lugs 600, 700, the leading and trailing flanks 410, 412, 510, 512, 602, 604, 702, 704 (or sides) of at least some (and preferably all) of the tabs and lugs are designed to be substantially straight along imaginary radial lines 408, 508 extending outward from the common axis of the rings, cover and piston. See, FIGS. 4-7. Although it is preferable that a tab's or lug's entire flank 410, 602, 510, 702 be straight (as shown in FIGS. 6 & 7), and that the flank terminate at a distal "point", one embodiment of the invention allows the flanks 802, 804, 808, 810, 902, 904, 908, 910 of tabs 800, 900 and lugs 806, 906 to merely be "substantially" straight. For example, and as shown in FIGS. 8 & 9, the distal portions of tabs 800, 900 (and spaces between lugs) could be rounded, so long as the majorities of each tab's or lug's flanks 802, 804, 808, 810, 902, 904, 908, 910 are substantially straight.

For purposes of this description, "substantially radial" flanks are defined to include those flank orientations falling between those of a tab with parallel flanks, and those of a lug with parallel flanks. Therefore, a substantially radial flank in FIG. 6 could vary between the flank orientations denoted by lines 606 and 608. Likewise, a substantially radial flank in FIG. 7 could vary between the flank orientations denoted by lines 706 and 708.

When a ring's tabs (400 or 500) are provided with substantially radial flanks (410/412 or 510/512), and the lugs 600, 700 corresponding thereto are provided with substantially radial flanks (e.g., flanks 602 and 702), the rings (120, 122, 124 or 126) operates as efficiently as possible in transferring torque within a torque converter 100. Efficient torque transfer means a clutch-pack's rings absorb fewer of the torsionals imparted thereto, and the torsionals are instead absorbed by the cover and piston (which have a greater mass and rigidity for absorbing the torsionals). As a result, the tab and lug design illustrated in FIGS. 2-7 subjects a clutch-pack's rings to less wear and peaning.

The tabs and lugs illustrated in FIGS. 2-7 are also beneficial in that they largely maintain their radial engagement as they wear (unlike tabs and lugs having generally roundish flanks, that tend to lose their snug fit as they wear). For example, refer to the tab and lug arrangement shown in FIG. 7. As a result of the radial engagement between flanks 510 and 702, and the similar radial engagement of all other flanks on ring 122, the flanks tend to wear evenly and maintain their radial engagement. Furthermore, even if the inner and outer circumferences of the ring 122 wear (or if the circumferences do not fit snugly to their mating surfaces when a torque converter 100 is first assembled), and the ring 122 begins to sag (i.e., as a result of the torque converter 100 having a horizontal axis of rotation and the rings having vertically aligned faces), the flanks 510 and 702 will still engage radially and tend to wear at a uniform rate.

Figure 10:
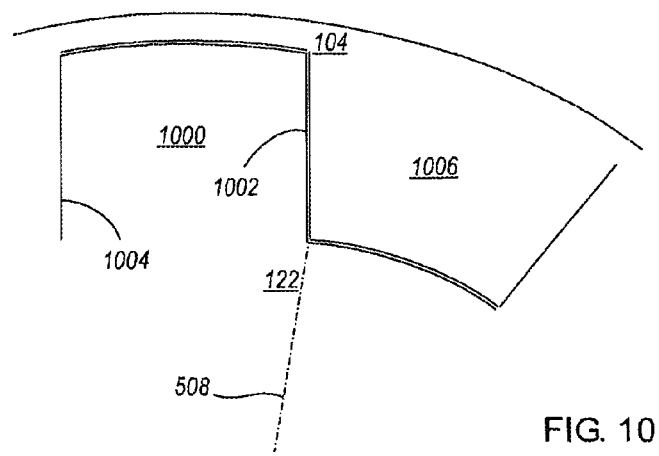
FIG. 10 illustrates a second alternative to the tab and lug design illustrated in FIGS. 6 & 7.

In an alternate tab and lug design (1000, 1006; FIG. 10), the flanks 1002, 1004 of tabs (e.g., tab 1000) or lugs (not shown) are designed to be parallel to one another, thus resulting in generally square tabs or lugs. Although they do not transfer torque as efficiently as tabs and lugs with radial flanks, tabs and lugs comprising parallel flanks still transfer torque more efficiently than tabs and lugs comprising generally rounded flanks.

Given that the tab and lug arrangements illustrated in FIGS. 4-10 are designed to transfer a greater number of torsional forces to the cover 104 and piston 116, the cover 104 and piston 116 need to have a sufficient mass and rigidity to absorb the torsional forces that will be applied to them. In one embodiment of the torque converter 100, the cover 104 and piston 116 are formed of billet steel.

Figure 11:
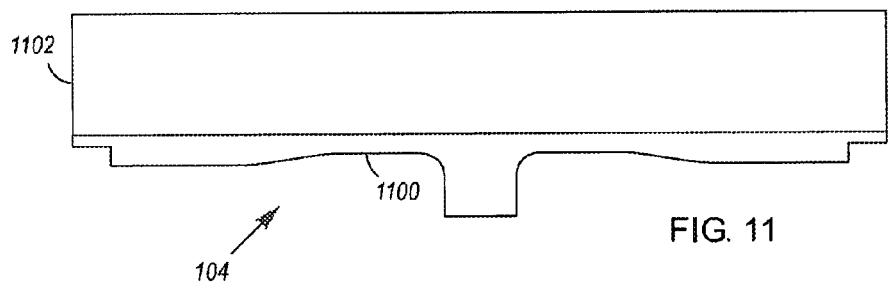
FIGS. 11 & 12 illustrate an exemplary two-piece embodiment of the torque converter cover shown in FIGS. 2 & 3.
Figure 12:
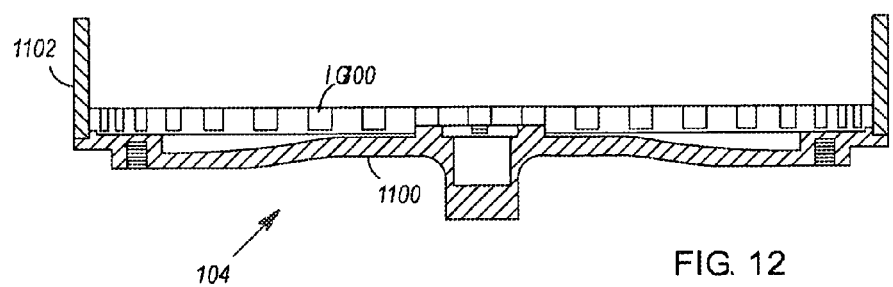

Although there are many ways to cut radial or square tabs and lugs from a torque converter's cover 104, piston 116 and rings 120, 122, 124, 126, cutting radial or square lugs in a torque converter's cover 104 is difficult. Typically, lugs are cut in a torque converter's cover 104 by means of drilling or milling. However, such operations make it difficult to produce straight flanks (e.g., radial or square flanks). This is because large drill bits and milling cutters produce too great of "rounds" at the corners of a lug, and small drill bits and milling cutters require too many repetitions or passes to make cover manufacture practical. FIGS. 11 & 12 therefore illustrate a two-pieces cover 104. The cover 104 comprises a base plate 1100 and a cylindrical wall piece 1102. In this manner, lugs 700 having straight flanks may be milled or otherwise formed in the base plate 1100 prior to fixing the base plate 1100 to the cylindrical wall piece 1102. By way of example, the base plate 1100 and cylindrical wall piece 1102 may be press fitted together, and then welded. Depending on the process used to press the two pieces together, one or both of the pieces may be heated to enable an easier fit.

If lugs are formed in a cover 104 as described in the preceding paragraph, the tabs 500, 502 of a clutch-pack ring 122, 126 may extend to within a few thousandths of an inch from the wall of the cover 104.

Typically, a torque converter's fluid coupling 140 (i.e., impeller 102, turbine 106, and optional stator 110) are used to transfer torque at low engine RPMs, and a torque converter's lockup clutch 108 is used to transfer torque at relatively higher engine RPMs. Although the fluid coupling 140 transfers more and more torque as an engine's RPM increases, the fluid coupling 140 can be relatively inefficient at low to mid engine RPMs. That is, the fluid coupling 140 can allow significant slip between the torque converter's impeller 102 and turbine 106. A vehicle's driver feels this slip as slow engine response, or an inability to pull a heavy load. The torque converter 100 itself feels this slip as lost energy that is converted to heat.

To reduce the slip between a torque converter's impeller 102 and turbine 106 at low to mid engine RPMs (i.e., before the torque converter 100 enters lockup by means of its lockup clutch), the surfaces or linings of the lockup clutch 108 may be spaced close enough that ones of the surfaces rotating with the impeller 102 exert a viscous pull on ones of the surfaces rotating with the turbine 106 when the torque converter 100 is filled with a viscous fluid. Thus, instead of the viscous fluid simply lubricating and cooling the surfaces of the lockup clutch 108, the viscous fluid serves as an element of a viscous coupling 142 between the surfaces of the lockup clutch 108. This causes the slip between the torque converter's impeller 102 and turbine 106 to fall more significantly with increasing engine RPM than if the torque converter 100 was provided with a fluid coupling 140 alone.

The average spacing that is needed between the surfaces of a lockup clutch 108 to achieve a viscous coupling 142 can vary, depending on the application. For example, for a 2005 Dodge Cummins using factory-recommended transmission fluid, an average clutch surface spacing of about $20/1000$ inch is believed sufficient and useful.

As previously indicated, when the impeller directs fluid toward the turbine 106, the turbine 106 moves toward the cover 104, and a fluid pressure between the turbine 106 and the piston 116 gradually increases with increasing engine RPM. As the pressure against the piston 116 increases, the piston 116, rings 120, 122, 124, 126 and cover 104 are compressed toward one another. This, in turn, decreases the average spacing of the rings 120, 122, 124, 126 and further enhances the effectiveness of the viscous coupling 142.

As the average spacing between the surfaces of a lockup clutch 108 is decreased, the molecular viscosity of a torque converter's viscous fluid, in combination with the relative but different velocities at which facing ones of the clutch-pack's surfaces rotate, causes a measurable (and then increasing) shear force in the viscous fluid. However, in a torque converter 100 such as that which is shown in FIGS. 1-3, it is not only "molecular viscosity" (i.e., the viscosity of the viscous fluid) that causes an increase in the shear force of the viscous fluid, but rather a combination of molecular viscosity and "eddy viscosity" (i.e., a dynamic viscosity that is based on the properties of a fluid flow, and not just a fluid's molecular viscosity alone).

Although an eddy viscosity is difficult to mathematically model, and can sometimes only be perceived as a result of measuring its ultimate effects, the manner in which an eddy viscosity increases the shear force of the viscous fluid in the torque converter 100 can be conceptually modeled as shown in FIGS. 13-16. It is noted that FIGS. 14-16 each show generalized and different exploded views of the clutch-pack rings 120, 122, 124, 126 shown in FIG. 13.

Figure 13:
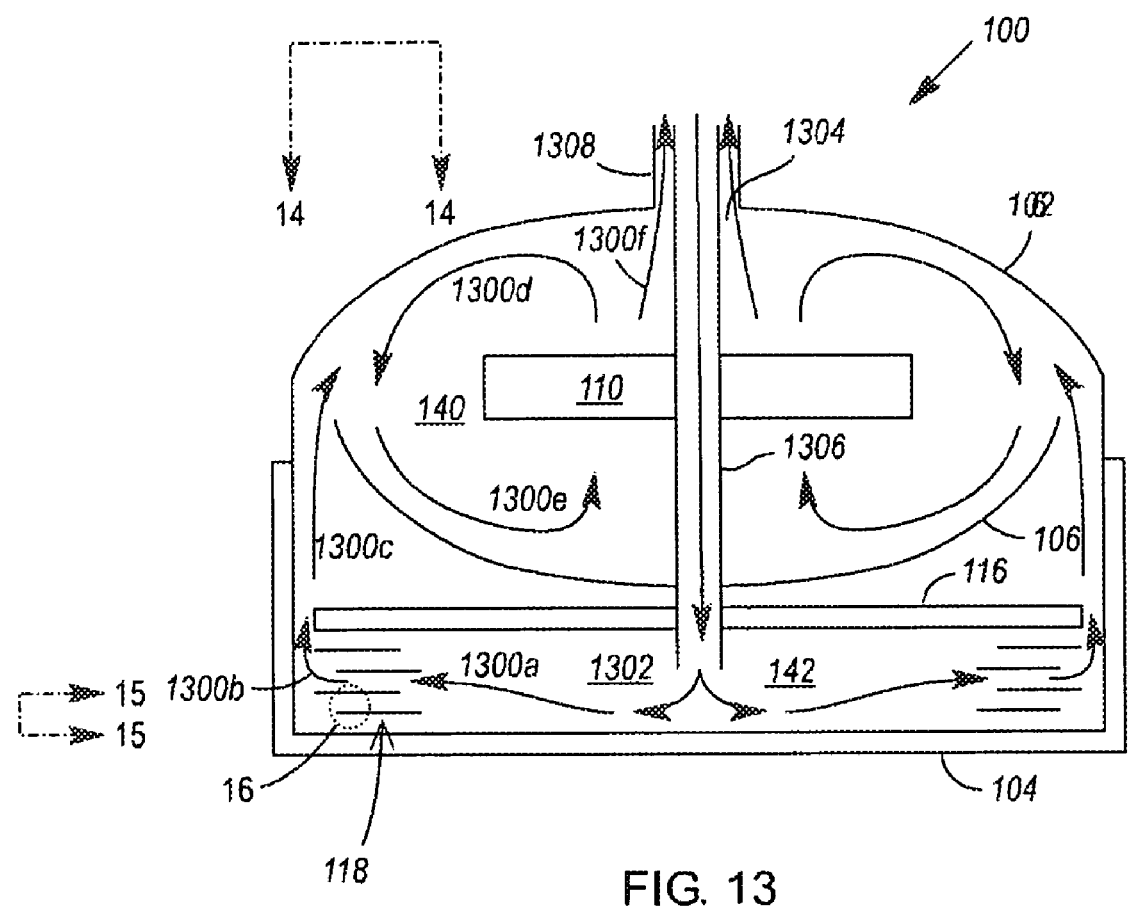
FIG. 13 illustrates a fluid pumping path through the torque converter shown in FIGS. 1-3 when the torque converter is not in "lockup"

FIG. 13 illustrates a fluid pumping path 1300a-f (referred to collectively as path 1300) through the torque converter 100 when the torque converter 100 is not in "lockup". The fluid pumping path 1300 is defined by a fluid receiving portion 1302 and a fluid return portion 1304 of the torque converter 100. As shown in FIG. 13, fluid from a vehicle's transmission is pumped through a transmission input shaft 1306, into the fluid receiving portion 1302 of the torque converter 100. By way of example, and preferably, the fluid receiving portion 1302 of the torque converter 100 is positioned interior to the rings 120, 122, 124, 126 of the torque converter's clutch-pack 118. From here, the fluid pumping path 1300 may traverse a path 1300a, 1300b extending between the rings of the clutch-pack 118, and eventually to the exterior of the clutch-pack rings 118. The fluid pumping path may then traverse a path 1300c from the exterior of the rings to the fluid coupling 140 (e.g., following a path 1300c that extends toward the impeller 102). Within the fluid coupling 140, the impeller 102 may redirect the fluid pumping path by pumping fluid (1300d) toward the turbine 106. The turbine 106 may then redirect the fluid pumping path again, by redirecting fluid (1300e) through the stator 110. Although fluid may circulate between the impeller 102 and the turbine 106 for some period of time, it is eventually expelled (1300f) from the torque converter 100 via the fluid return portion 1304 of the torque converter 100, which may be located at the hub 1308 (e.g., via a gap between the input shaft 1306 and the hub 1308). In this manner, the same viscous fluid traverses a fluid pumping path 1300 through both 1) the torque converter's viscous coupling 142, and 2) the torque converter's fluid coupling 140.

Figure 14:
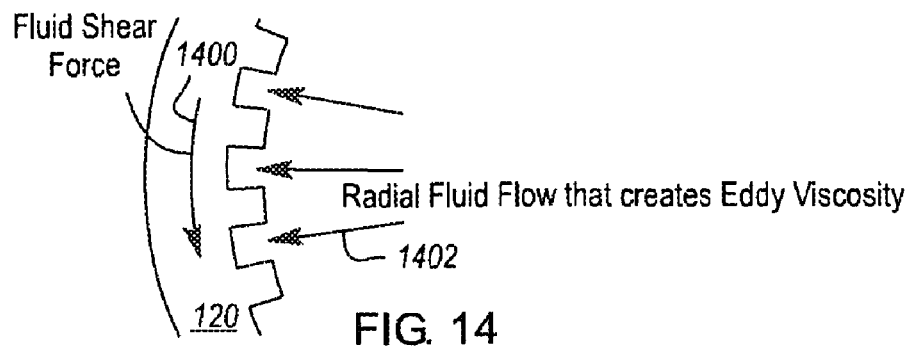
FIGS. 14-16 illustrate the shear forces and eddy viscosity that exist during operation of the clutch pack of the torque converter shown in FIGS. 1-3, via various exploded views of the torque converter clutch-pack rings shown in FIG. 13.
Figure 15:
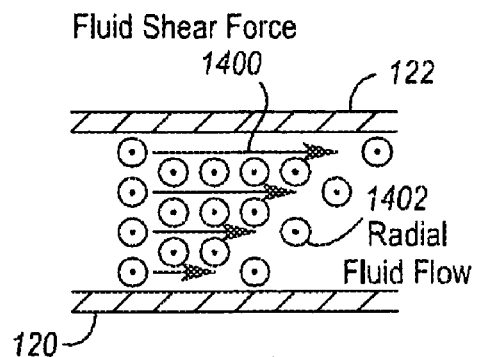
Figure 16:
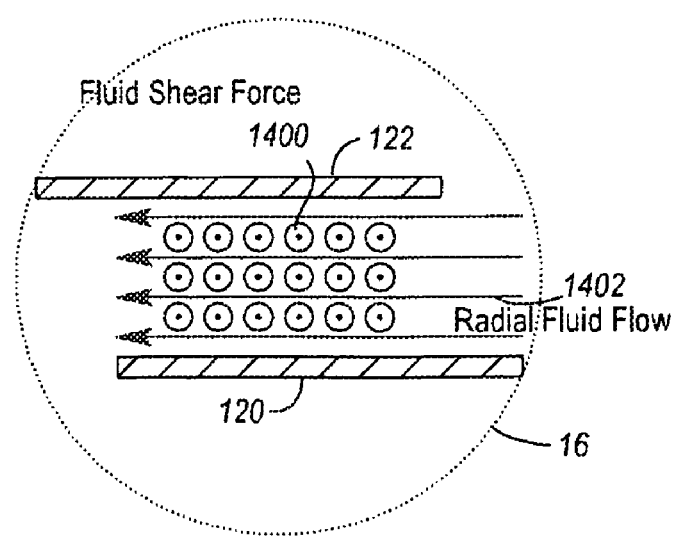

As the torque converter's viscous fluid traverses between the rings 120, 122, 124, 126 of the clutch-pack 118, the rotational movement of the rings 122, 126 that are splined to the impeller 102 creates a fluid shear force, as shown by the curved fluid shear force "velocity vector" 1400 in FIG. 14, the horizontal velocity vectors 1400 in FIG. 15, and the point velocity vectors 1400 (the ones that are perpendicular to the page) in FIG. 16. As a result of the molecular viscosity of the fluid, the fluid shear force created by the surfaces of the impeller-splined rings 122, 126 (including a surface of the cover 104) exert a pull on the surfaces of the turbine-splined rings 120, 124 (including a surface of the piston 116), and the turbine-splined rings 120, 124 are forced to rotate in the same direction as the impeller-splined rings 122, 126, and with more rotational velocity (i.e., approaching impeller RPM).

In addition to the fluid shear force created by rotational movement of the impeller-splined rings 122, 126, additional fluid shear force is created by means of the torque converters fluid being pumped radially from the center of the torque converter 100, between the torque converters clutch-pack rings 118. The fluid pumping path 1300 is shown by the radial fluid flow "velocity vectors" 1402 in FIG. 14, by the point velocity vectors 1402 in FIG. 15, and by the horizontal velocity vectors 1402 in FIG. 16. As a result of the fluid pumping path 1300 intersecting the largely laminar, irrotational flow caused by rotation of the impeller-splined rings 122, 126, a turbulent flow is created between the rings 120, 122, 124, 126 (including surfaces of the cover 104 and piston 116), thereby creating an "eddy viscosity". The flow is especially turbulent, and therefore magnifies the eddy viscosity, because the impeller-splined rings 122, 126 typically rotate at several hundred to a few thousand revolutions per minute, and the fluid pumping path 1300 typically carries fluid at more than one US gallon per minute.

As previously indicated, an eddy viscosity is difficult to mathematically model. However, its effect is to cause the fluid between the torque converter's rings 120, 122, 124, 126 to move in randomly mixed patterns, such that fluid momentum transfer happens by means of discrete masses of fluid (rather than by means of a laminar "flow"). This effectively increases the viscosity of the fluid, and thereby increases the shear force (or pulling force) of the fluid. A more efficient transfer of torque therefore occurs between the rings 120, 122, 124, 126 than if the clutch-pack 118 was sealed, or otherwise positioned outside of the torque converter's fluid pumping path 1300.

The rings 120, 122, 124, 126 of the viscous coupling 142 may be stamped from a metal such as steel. However, it has been found that surfaces with lower coefficients of friction can improve the operation of a viscous coupling (which is logical, since some of the purposes of a viscous coupling are to reduce friction, generate less heat, and transfer more power to a vehicle's transmission). One way to obtain a coefficient of friction that is lower than that of steel is to cover one or both of a ring's surfaces (and the interior of the cover 104 or second side of ring 120) with a lining or linings 128, 130, 132, 134, 136 that include, or consist of, a poly-paraphenylene terephthalamide-based product (e.g., a KEVLAR®-based product). Such a lining has a coefficient of friction that is low enough to improve the operation of the viscous coupling, but high enough to enable a frictional lockup during engagement of the lockup clutch 108 (i.e., especially when the slip speed of the torque converter 100 is small, and the impeller 102 and turbine 106 are rotating at or near the same speed). Although FIGS. 2-5 only show linings on one surface of each ring 120, 122, 124, 126, linings can also be placed on both surfaces of each ring 120, 122, 124, 126.

As shown in FIGS. 2 & 3, one or more of the surfaces of the rings 120, 122, 124, 126 used to provide a viscous coupling 142 may have a plurality of slots formed therein. The slots are useful in that they enable the rings 120, 122, 124, 126 to trap fluid during torque converter lockup. Then, when the torque converter 100 exits lockup, fluid that was trapped in the slots is readily available for lubrication of the rings' surfaces (so that the linings 128, 130, 132, 134, 136 wear better over time). The slots are also useful in increasing the total surface area of a ring 120, 122, 124, 126, thereby increasing the shear force that it exerts (or feels) as the fluid between facing surfaces of adjacent rings is sheared.

When providing slots in a ring's surface, the slots may be formed solely in a lining 128 of the ring 120, or the slots may extend all the way through the ring 120. In one embodiment, each of the slots has a length that is greater than its width, and the length of each slot 1) intersects one of a plurality of imaginary radial lines extending from the axis about which the ring rotates, and 2) intersects one of the imaginary radial lines in a relationship that is other than perpendicular (e.g., the slots may intersect the imaginary radial lines at about a 45 degree angle. See FIG. 3.

Although the viscous coupling 142 described in the preceding paragraphs is implemented using the rings 120, 122, 124, 126 of a lockup clutch 108, it need not be. That is, an additional set of rings (or other elements having closely-spaced surfaces where facing ones of the surfaces are alternately splined to rotate with a torque converter's impeller or turbine) could be provided externally to the lockup clutch 108. In such an embodiment, the rings would not be compressed for the purposes of locking up the torque converter, but would provide a viscous coupling whenever there was slip between the torque converter's impeller and turbine. Also, regardless of whether the viscously-coupled rings are provided within or outside of the lockup clutch, the number of rings may vary. Depending on the application, more of fewer rings and viscously-coupled surfaces may be provided. The choice of how many rings are provided depends on a variety of factors, such as: the spacing of the rings, the numbers and types of surfaces on the rings, the type of viscous fluid that a torque converter is designed to hold, and the amount of viscous coupling that is desired. In presently preferred embodiments, however, two or more rings (and preferably four) are used.

Figure 17:
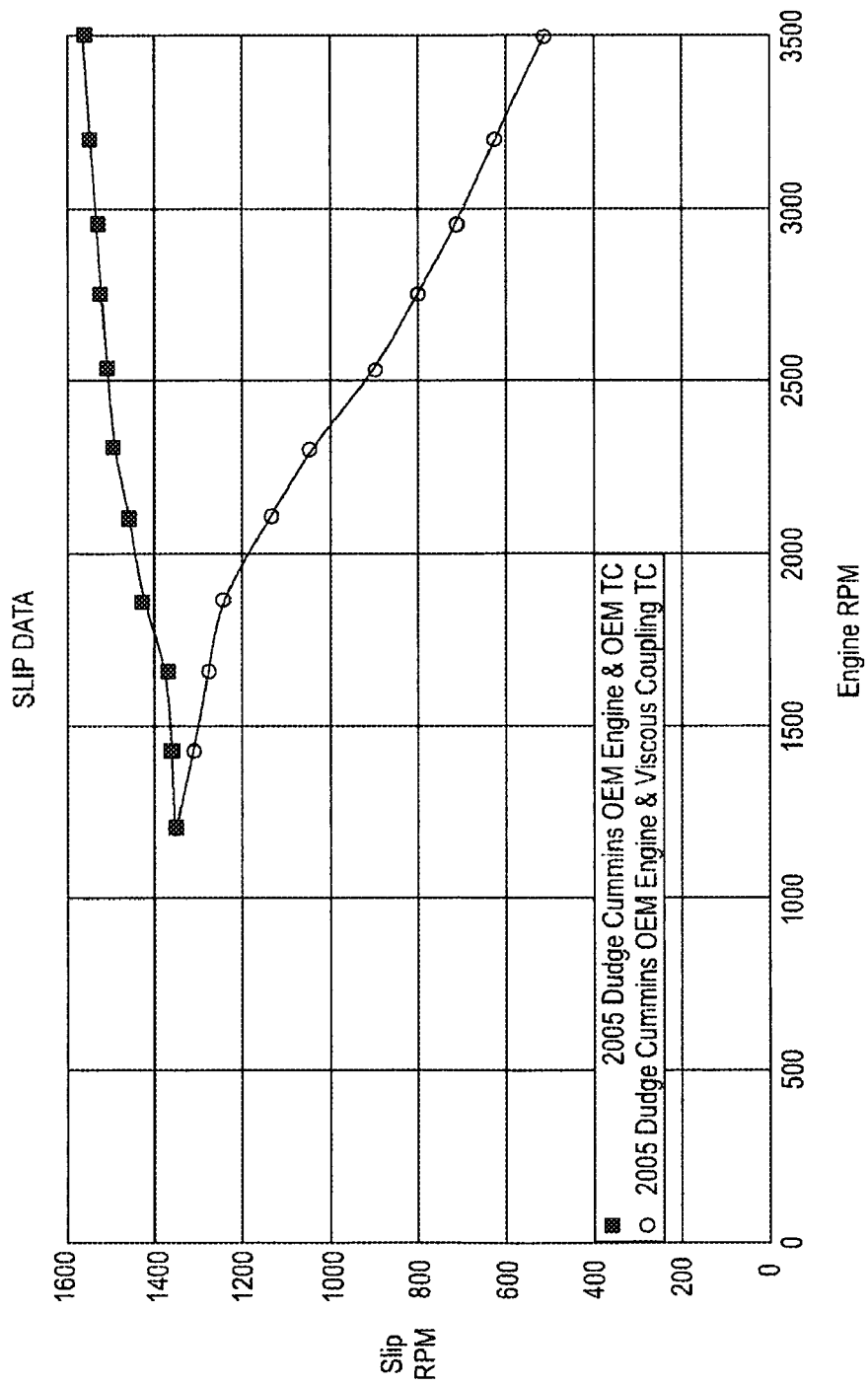
FIG. 17 illustrates an exemplary graph of Slip Data, in which "Engine RPM" is compared to "Slip RPM"

Depending on its configuration, the use of a viscous coupling 142 within a torque converter 100 can provide various advantages over a fluid coupling 140 alone. As already alluded to, a viscous coupling 142 can provide increased efficiency in transferring engine torque at low to mid engine RPMs. See, for example, the exemplary graph shown in FIG. 17, in which "Engine RPM" is compared to "Slip RPM" (i.e., the difference in engine RPM versus torque converter output RPM) for 1) a 2005 Dodge Cummins OEM engine and torque converter, and 2) a 2005 Dodge Cummins OEM engine mated with a torque converter employing a 4-ring, five clutch surface, viscous coupling. The data graphed in FIG. 17 was obtained using a Mustang Dynamometer set at a 10,000 lb. load and 7% grade.

A viscous coupling 142 can also reduce the delta velocity (Av) between the clutch pack rings 120, 122, 124, 126 of a torque converter 100, thereby reducing the amount of heat that is generated within the torque converter 100, and also reducing torque converter and transmission system wear.

The added torque transfer provided by the viscous coupling 142 can also improve fuel economy.

Figure 18:
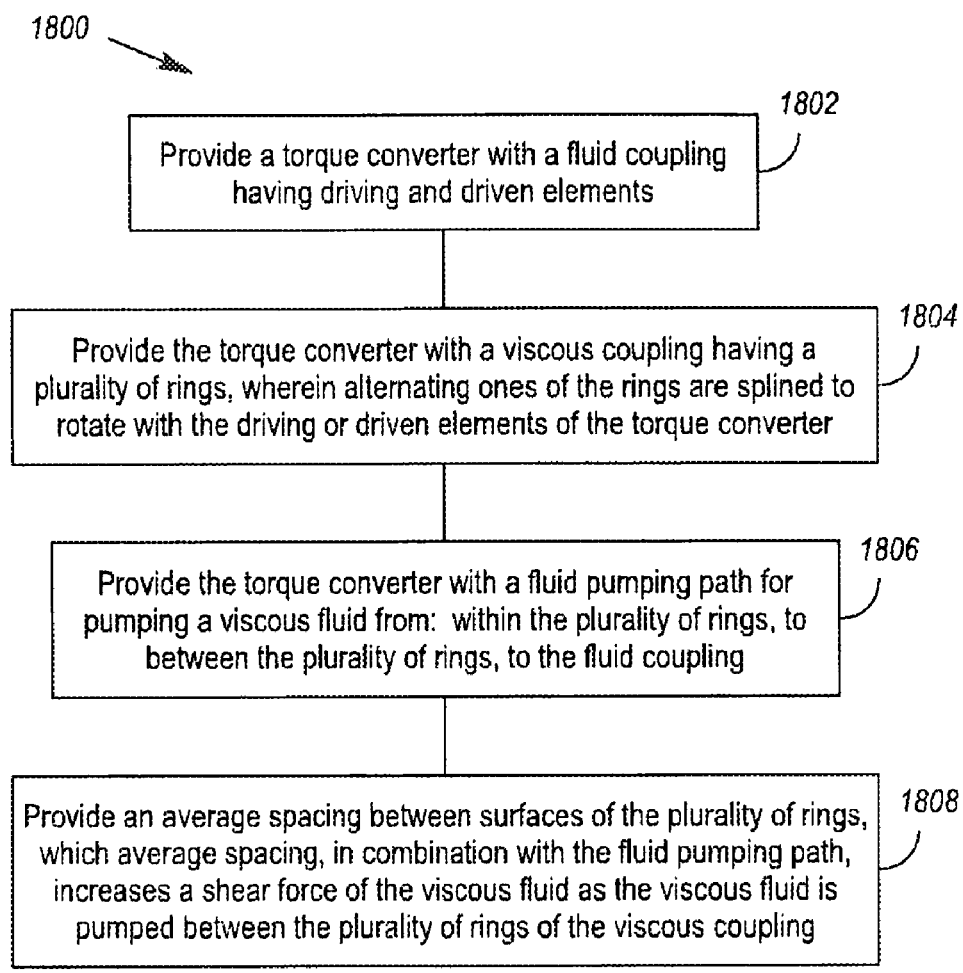
FIG. 18 illustrates an exemplary method of designing a torque converter.

In accord with the above-described apparatus, FIG. 18 illustrates an exemplary method 1800 of designing a torque converter. The method 1800 comprises 1) providing the torque converter with a fluid coupling having driving and driven elements (at block 1802), 2) providing the torque converter with a viscous coupling having a plurality of rings, wherein alternating ones of the rings are splined to rotate with the driving or driven elements of the torque converter (at block 1804), 3) providing the torque converter with a fluid pumping path for pumping a viscous fluid from within the plurality of rings, to between the plurality of rings, to the fluid coupling (at block 1806), and 4) providing an average spacing between surfaces of the plurality rings such that the average spacing, in combination with the fluid pumping path, increases a shear force of the viscous fluid as the viscous fluid is pumped between the plurality of rings of the viscous coupling (at block 1808). The order of the method's steps 1802, 1804, 1806, 1808 is not critical.

Figure 19:
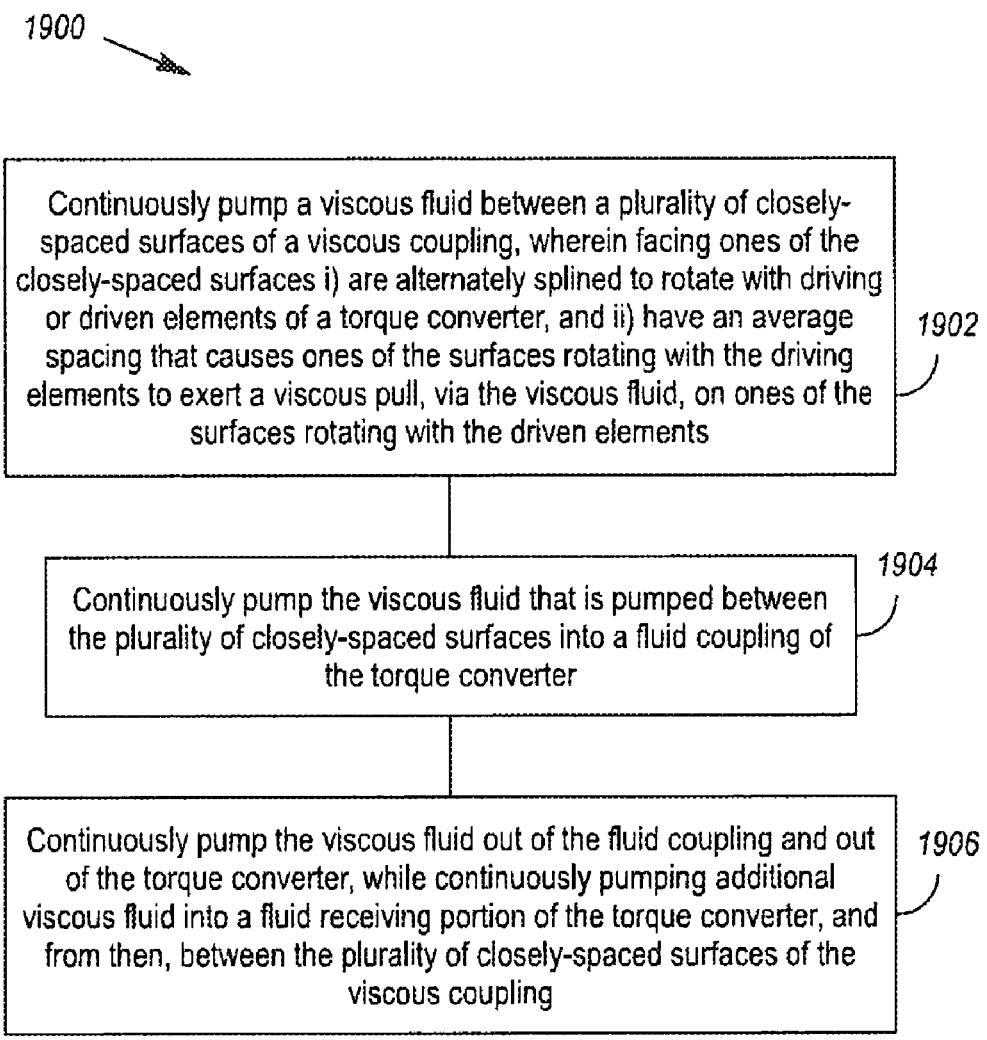
FIG. 19 illustrates a method for improving torque transfer in a torque converter.

FIG. 19 illustrates a method 1900 for improving torque transfer in a torque converter. The method 1900 comprises, during operation of the torque converter, continuously pumping a viscous fluid between a plurality of closely-spaced surfaces of a viscous coupling (at block 1902). Facing ones of the closely-spaced surfaces 1) are alternately splined to rotate with driving or driven elements of the torque converter, and 2) have an average spacing that causes ones of the surfaces rotating with the driving elements to exert a viscous pull, via the viscous fluid, on ones of the surfaces rotating with the driven elements. As the above step is being performed, the viscous fluid that is pumped between the plurality of closely-spaced surfaces is continuously pumped into a fluid coupling of the torque converter (at block 1904). Optionally, but preferably, the viscous fluid may be continuously pumped out of the fluid coupling, and out of the torque converter, while additional viscous fluid is continuously pumped into a fluid receiving portion of the torque converter, and then, between the plurality of closely-spaced surfaces of the viscous coupling (at block 1906).

What is claimed is:

1. A torque converter, comprising:
    a fluid coupling, including,
        i) an impeller, configured for rotation about an axis and having a fluid-directing surface; and
        ii) a turbine, configured for rotation about the axis and having a fluid-receiving surface facing the fluid-directing surface of the impeller, the turbine rotating about the axis independently of the impeller;
    a viscous coupling including a plurality of closely-spaced surfaces, wherein facing ones of the closely-spaced surfaces are alternately splined to rotate with the impeller or the turbine, and wherein the closely-spaced surfaces have an average spacing that causes ones of the surfaces rotating with the impeller to exert a viscous pull on ones of the surfaces rotating with the turbine when the torque converter is filled with a viscous fluid;
    a cover, fixed to the impeller to form a cavity in which the turbine and plurality of closely-spaced surfaces are enclosed; and
    a fluid receiving portion to receive the viscous fluid into the torque converter, and a fluid return portion from which the viscous fluid is expelled from the torque converter, wherein the fluid receiving and fluid return portions are positioned to define a fluid pumping path through the torque converter, and wherein the fluid pumping path i) traverses paths through both the viscous coupling and the fluid coupling, and ii) traverses paths between the closely-spaced surfaces of the viscous coupling.

2. The torque converter of claim 1, further comprising a stator, configured for rotation about the axis between said fluid-directing and fluid-receiving surfaces, between the impeller and the turbine.

3. The torque converter of claim 1, further comprising a set of two or more rings, alternating ones of which are splined to rotate with the impeller or the turbine, the plurality of closely-spaced surfaces comprising surfaces of the rings.

4. The torque converter of claim 3, wherein the fluid pumping path traverses paths extending from: interior to the set of two or more rings, to between the closely-spaced surfaces, to exterior to the set of two or more rings.

5. The torque converter of claim 3, wherein the surface of at least one of the rings has a plurality of slots formed therein.

6. The torque converter of claim 5, wherein each of the slots has a length that is greater than its width, and wherein the length of each slot i) intersects one of a plurality of imaginary radial lines extending from the axis about which the impeller rotates, and ii) intersects one of the imaginary radial lines in a relationship that is other than perpendicular.

7. The torque converter of claim 1, further comprising a piston, splined to and rotating with the turbine between the turbine and the cover, wherein the plurality of closely-spaced surfaces form a clutch-pack between the piston and the cover, with one of the closely-spaced surfaces being an inner surface of the cover, and another of the closely-spaced surfaces being a surface of the piston facing the cover.

8. The torque converter of claim 7, wherein the piston causes the viscous pull between the closely-spaced surfaces to change to a frictional lockup between the closely-spaced surfaces when i) an initial fluid flow direction through the torque converter is reversed, and ii) a pressure of the viscous fluid is increased to a torque converter lockup pressure.

9. The torque converter of claim 7, further comprising a set of two or more rings, alternating ones of which are splined to rotate with the impeller or the turbine, the set of rings being positioned between the piston and the cover, and the plurality of closely-spaced surfaces further comprising surfaces of the rings.

10. The torque converter of claim 9, wherein the fluid pumping path traverses paths extending from: interior to the set of two or more rings, to between the closely-spaced surfaces, to exterior to the set of two or more rings.

11. The torque converter of claim 9, wherein the set of two or more rings is a set of four rings.

12. The torque converter of claim 11, wherein the average spacing between the closely-spaced surfaces is about $20/1000$ inch.

13. The torque converter of claim 9, wherein:
those of the set of two or more rings that rotate with the impeller have a plurality of outwardly facing tabs splined to a plurality of lugs on the cover; and
at least some of the outwardly facing tabs and their corresponding lugs comprise straight flanks.

14. The torque converter of claim 9, wherein:
those of the set of two or more rings that rotate with the impeller have a plurality of outwardly facing tabs splined to a plurality of lugs on the cover; and
at least some of the outwardly facing tabs and their corresponding lugs have an orientation between radial and parallel.

15. The torque converter of claim 9, wherein:
those of the set of two or more rings that rotate with the turbine have a plurality of inwardly facing tabs splined to a plurality of lugs on the piston; and
at least some of the inwardly facing tabs and their corresponding lugs comprise straight flanks.

16. The torque converter of claim 9, wherein:
those of the set of two or more rings that rotate with the turbine have a plurality of inwardly facing tabs splined to a plurality of lugs on the piston; and
at least some of the inwardly facing tabs and their corresponding lugs have an orientation between radial and parallel.

17. The torque converter of claim 9, wherein the surface of at least one of the rings has a plurality of slots formed therein.

18. The torque converter of claim 17, wherein each of the slots has a length that is greater than its width, and wherein the length of each slot i) intersects one of a plurality of imaginary radial lines extending from the axis about which the impeller rotates, and ii) intersects one of the imaginary radial lines in a relationship that is other than perpendicular.

19. The torque converter of claim 9, wherein one or more of the surfaces of the rings has a lining that includes a polyparaphenylene terephthalamide-based product.

20. The torque converter of claim 1, wherein one or more of the closely-spaced surfaces has a lining that includes a polyparaphenylene terephthalamide-based product.

21. A torque converter, comprising:
fluid coupling means, including,
  i) fluid-directing means configured for rotation about an axis; and
  ii) fluid-receiving means facing the fluid-directing means and rotating about the axis independently of the fluid-directing means, the fluid-receiving means being configured to rotate about the axis when the fluid-directing means churns a viscous fluid with which the torque converter is filled;
viscous coupling means for, by means of the viscous fluid, imparting a viscous pull between i) one or more surfaces that rotate with the fluid-directing means, and ii) one or more surfaces that rotate with the fluid-receiving means;
enclosure means, fixed to the fluid-directing means, for forming a cavity in which the receiving means and viscous coupling means are enclosed; and
a fluid receiving portion to receive the viscous fluid into the torque converter, and a fluid return portion from which the viscous fluid is expelled from the torque converter, wherein the fluid receiving and fluid return portions are positioned to define a fluid pumping path through the torque converter, and wherein the fluid pumping path traverses paths through both the viscous coupling means and the fluid coupling means.

22. A torque converter, comprising:
a viscous coupling including a plurality of closely-spaced surfaces, wherein facing ones of the closely-spaced surfaces are alternately splined to rotate with driving or driven elements of the torque converter, and wherein the closely-spaced surfaces have an average spacing that causes ones of the surfaces rotating with the driving elements to exert a viscous pull on ones of the surfaces rotating with the driven elements when the torque converter is filled with a viscous fluid;
a fluid receiving portion to receive a viscous fluid into the torque converter, and a fluid return portion from which the viscous fluid is expelled from the torque converter, wherein the fluid receiving and fluid return portions are positioned to define a fluid pumping path through the torque converter, wherein the fluid pumping path traverses paths between the closely-spaced surfaces of the viscous coupling, and wherein the fluid pumping path increases a shear force of the viscous fluid as the viscous fluid is pumped between the closely-spaced surfaces of the viscous coupling.

23. The torque converter of claim 22, further comprising a fluid coupling between the driving and driven elements, and wherein the fluid pumping path further traverses a path through the fluid coupling.

* * * * *

UNITED STATES PATENT AND TRADEMARK OFFICE
CERTIFICATE OF CORRECTION

PATENT NO. : 7,717,243 B2
APPLICATION NO. : 11/590512
DATED : May 18, 2010
INVENTOR(S) : Clint D. Cannon It is certified that error appears in the above-identified patent and that said Letters Patent is hereby corrected as shown below:

In the Detailed Description, column 9, line 19, "(Av)" should read --($\Delta$v)--.

Signed and Sealed this

Twenty-seventh Day of July, 2010

David J. Kappos
*Director of the United States Patent and Trademark Office*